J. T. CLARK.
AUTOMATIC NUT LOCK.
APPLICATION FILED SEPT. 24, 1906.

904,937.

Patented Nov. 24, 1908.

Witnesses

Inventor
James T. Clark.

UNITED STATES PATENT OFFICE.

JAMES TEMPLE CLARK, OF MONTREAL, QUEBEC, CANADA.

AUTOMATIC NUT-LOCK.

No. 904,937.          Specification of Letters Patent.          Patented Nov. 24, 1908.

Application filed September 24, 1906. Serial No. 335,870.

*To all whom it may concern:*

Be it known that I, JAMES TEMPLE CLARK, of the city of Montreal, in the Province of Quebec and Dominion of Canada, have invented certain new and useful Improvements in Automatic Nut-Locks, and do hereby declare that the following is a full, clear, and exact description of the invention, such as will enable others skilled in the art to which it appertains to make and use the same.

My invention relates to automatic nut locks and is designed as an improvement upon U. S. A. Patent, No. 809,044, dated Jan. 2nd, 1906, granted to me. In the above mentioned patent, the body of the washer comprising the nut lock was formed with an approximately flat under surface having raised fingers upon its upper side. It has been found by experiment that fingers bent upwardly from a flat surface are liable to break when tempered on account of the short bend which takes place at the junction of the fingers and the washer. To eliminate this difficulty, I have formed the washer with a dished or concave under surface, which allows the fingers to be bent upwardly with a comparatively long sweeping curve. A further advantage in dishing the washer is that it holds the nut constantly in spring tension, which, under certain circumstances, is very desirable.

Figure 1:
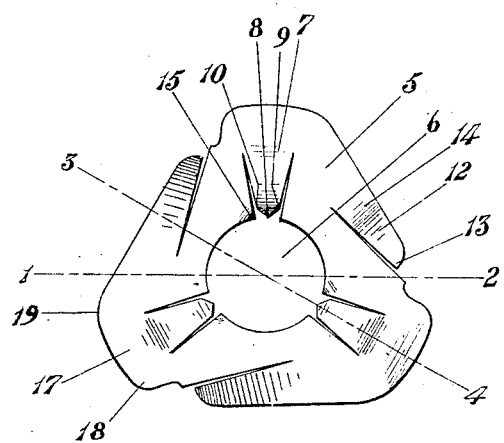
Figure 2:
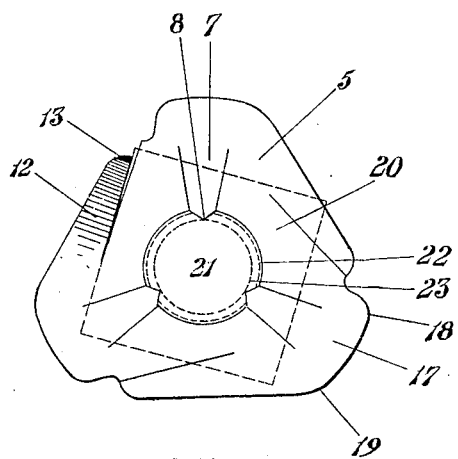
Figure 3:
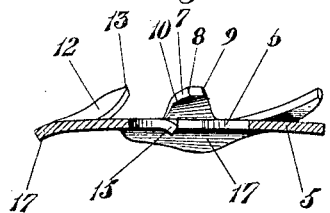
Figure 4:
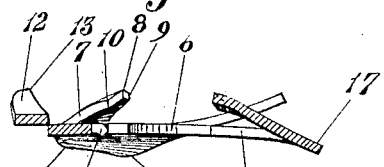
Figure 5:
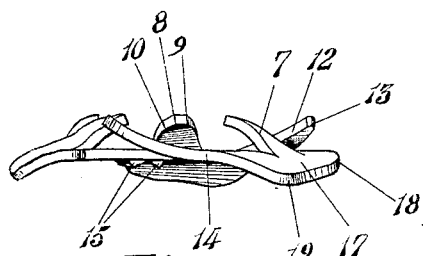
Figure 6:
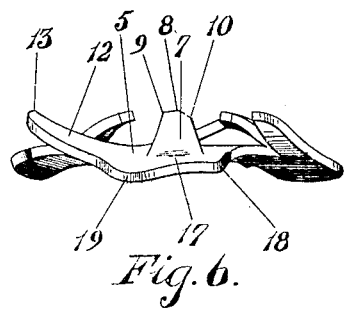

Further objects and advantages will appear from the following drawings and specification.
In the accompanying drawings which illustrate my device,—Figure 1 is a plan view of the preferred form of my device. Fig. 2 is a plan view showing the position of a nut when screwed down and held from backward movement by the outer finger. Fig. 3 is a cross section on line 1—2 of Fig. 1. Fig. 4 is a cross section on line 3—4 of Fig. 1. Fig. 5 is a side elevation of the device and shows the dishing and the curvature of the fingers. Fig. 6 is an elevation looking toward one corner of the device.

In the preferred form of my invention I employ a washer 5 of tempered spring steel of suitable thickness and of the shape shown in Fig. 1, having a central circular opening 6 to allow the passage of a bolt therethrough. Extending radially from the central opening are a plurality of fingers 7, preferably three in number, which are cut a suitable distance into the body of the washer. These fingers are pointed at their extremities 8 and are bent upwardly at the center 9 so that the points will normally lie flush with the periphery of the central opening 6, as shown in Fig. 1. The fingers, however, are of such a length that, when flattened down level with the surface of the washer, the pointed extremities 8 will project into the central opening, to the extent of approximately the depth of the thread of a bolt, as shown in Fig. 2. The points of the fingers 7 do not lie normally in a horizontal direction parallel with the surface of the washer, but are bent upwardly from left to right when looking towards the points, as seen in Fig. 3 which shows the finger points inclined from the lower edge 10 to the upper edge designated 9.

It will be understood that the washer, as shown in the drawings, is designed for a right hand threaded bolt, and the purpose of the inclined points is to allow a nut to pass freely from left to right over the finger points without the possibility of the under surface of the nut being caught by the edge of the fingers 7. This allows a nut to be screwed down on the washer without the latter being carried around the bolt with the nut. To further prevent the washer from turning with the nut, the points 15, adjacent the lower edge 10 of the finger 7, are turned in a slightly downward direction so that, when any pressure is placed on the washers, these points will be forced into the material upon which the washer is placed and so prevent the washer from turning.

At the outer periphery of the washer and preferably between the fingers 7, a second series of fingers 12 are cut from the washer, as shown in Figs. 1 and 2. The middle portions 14 of these fingers form, as shown in Figs. 5 and 6, the center of a reverse curve, while the points 13 are bent upwardly as seen. These outer fingers are arranged so that in turning a nut from left to right over the washer, the points of the fingers lie away from the nut.

It will be seen upon reference to Figs. 5 and 6, that the portions 17 of the washer, adjacent the junction of the fingers 7 with the washer, are bent downwardly. In addition to being bent downwardly, the portions 17 are also bent obliquely so that the corners 19 adjacent the roots of the fingers 12 will be lower than the corners 18 adjacent the points of the fingers 12. The purpose of the downwardly turned corners 19, is to allow the washer to grip the material upon which it is placed in order to prevent said washer from turning with the nut until it is sufficiently flattened down for the inner points 15 to engage said material.

As stated above, fingers bent upwardly from a flat surface are weakened by reason of the short curve which takes place at the roots of the fingers. By dishing the washer, however, the sharp curve at the root of each finger is obviated and a long reverse curve is produced in the fingers, which allows said fingers to be flattened down by pressure of the nut without impairing the spring of the metal. Furthermore, by bending the corners 19 downwardly to lie in a lower plane than the corners 18, the outer fingers 12 are given an additionally long reverse curve, which tends to hold the points 13 above the upper surface of the washer.

The operation of the device is as follows:— The washer 5 is slipped over the threaded end of the bolt 21 until it rests against the material through which the bolt has been passed. The nut 20 is then screwed down, and on coming in contact with the inclined points of the fingers 7, passes freely over same, as above described. The downwardly turned points 19 grip the material upon which the washer is placed and prevent said washer from turning with the nut. The fingers 7 are gradually forced down flush with the surface of the washer and the points 8 are forced from the outer circumference 22 through the thread to the inner circumference 23, cutting out a small V-shaped opening, and thus preventing any turning movement of the washer. As the dished washer becomes flattened through pressure, the points 15 will also engage the material under the washer to further prevent any turning movement. As the nut passes over the fingers 12, the points 13 are forced downwardly, but immediately upon being released as the edge of the nut passes over the finger, the points 13 spring back to their normal position. When the nut is sufficiently tightened, one edge of the same is left against the upwardly bent portion 13, as shown in Fig. 2, thus effectually preventing the nut from turning in a backward direction. The dishing of the washer is found to be especially advantageous as the nut is held constantly in spring tension and may be further tightened at intervals, if necessary, by forcing the dished washer into a flattened condition. The spring tension of a series of nuts is particularly effective in rail joints.

Having thus described my invention so that the same may be readily understood by those skilled in the art to which it appertains, what I claim and desire to secure by Letters Patent is:—

1. A nut lock comprising a dished washer having a plurality of integral, pointed, radial fingers, upwardly curved at their central portions and adapted, when flattened down, to extend into the central opening of the washer, and a plurality of integral, reversely curved, outer fingers.

2. A nut lock comprising a dished washer of spring metal having a plurality of integral, pointed, radial fingers inclined upwardly from left to right at their pointed ends, and a plurality of reversely curved outer fingers.

3. A nut lock comprising a dished washer having a plurality of integral, pointed, radial fingers, and a plurality of outer fingers, said washer having the points adjacent the roots of the outer fingers lying in a lower plane than the points adjacent the ends of said fingers.

4. A nut lock comprising a dished washer of spring metal having a plurality of radial fingers provided with inclined pointed ends, a plurality of downwardly turned points adjacent to said fingers, and a series of outer fingers curved upwardly at their points and downwardly at their roots.

5. In a washer having a central opening, a plurality of radial fingers having upwardly curved central portions and inclined pointed ends, downwardly extending points in the periphery of the central opening adjacent to the radial fingers, and a plurality of reversely curved outer fingers, the roots of which lie in a lower plane than any other portion of the washer.

6. A nut lock comprising a dished washer having a plurality of radial fingers with upwardly bent central portions and inclined pointed ends, a plurality of downwardly turned points adjacent to said fingers, and a series of upwardly bent, reversely curved outer fingers, the roots of said fingers lying in a lower plane than any other portion of the washer.

7. A nut lock comprising a trefoil dished washer having radial fingers with upwardly bent central portions and inclined pointed ends, downwardly turned points adjacent the ends of said fingers, and a plurality of upwardly bent, reversely curved, outer fingers adapted to lock the nut against return movement.

8. A nut lock comprising a trefoil convex washer having radial fingers with upwardly bent central portions and inclined pointed ends adapted to engage the thread of a bolt, downwardly turned points adjacent the ends of said fingers, a plurality of upwardly bent, reversely curved, outer fingers, and means for engaging the under-side of the washer with the material against which it is placed.

9. As a new article of manufacture, a nut lock, comprising a washer provided with a dished body, said washer provided with inner and outer fingers, the outer fingers being reversely curved, and said washer provided with downwardly-extending portions formed upon its outer edge contiguous to the roots or inner ends of the outer fingers.

In witness whereof I have hereunto set my hand in the presence of two witnesses.

JAMES TEMPLE CLARK.

Witnesses:
C. W. TAYLOR,
STUART R. W. ALLEN.